(12) United States Patent
Takeuchi (10) Patent No.: US 7,722,130 B2
(45) Date of Patent: May 25, 2010

(54) BRAKE SYSTEM FOR STRADDLE-TYPE VEHICLE

(75) Inventor: Hitoshi Takeuchi, Shizuoka-ken (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 174 days.

(21) Appl. No.: 11/316,348

(22) Filed: Dec. 21, 2005

(65) Prior Publication Data
US 2006/0152071 A1 Jul. 13, 2006

(30) Foreign Application Priority Data

Dec. 21, 2004 (JP) ............................ 2004-368909
Nov. 18, 2005 (JP) ............................ 2005-334940

(51) Int. Cl.
B60T 13/00 (2006.01)

(52) U.S. Cl. ................. 303/9.64; 303/13; 188/24.16; 188/106 PF; 188/106 P; 188/344; 188/2 D (58) Field of Classification Search ............... 303/9.64, 303/13; 188/106 P, 106 F, 2 D, 24.16, 345; 74/502.2, 488, 489
See application file for complete search history.

(56) References Cited

U.S. PATENT DOCUMENTS

| | | | | |
|---|---|---|---|---|
| 4,626,038 A | * | 12/1986 | Hayashi et al. | ............ 303/9.64 |
| 4,660,683 A | * | 4/1987 | Hayashi et al. | ........... 188/18 A |
| 4,779,482 A | * | 10/1988 | Kawaguchi | .................. 74/523 |
| 6,478,103 B1 | | 11/2002 | Matsuura | |

| | | | | |
|---|---|---|---|---|
| 6,557,949 B2 | * | 5/2003 | Tani et al. | .................. 303/9.64 |

FOREIGN PATENT DOCUMENTS

| | | |
|---|---|---|
| DE | 573 683 | 4/1933 |
| EP | 1 475 797 | 11/2004 |
| FR | 694 973 | 12/1930 |
| FR | 2 514 716 | 4/1983 |
| JP | 07 293610 | 11/1995 |
| JP | 09 058434 | 3/1997 |

(Continued)

OTHER PUBLICATIONS

EP Application No. EP 05 02 8108; European Search Report; Apr. 21, 2008.

Primary Examiner—Robert A Siconolfi
Assistant Examiner—Mariano Sy
(74) Attorney, Agent, or Firm—Keating & Bennett, LLP (57) ABSTRACT

An improved brake system is provided for a vehicle including at least front and rear wheels. The brake system comprises a braking force generating mechanism, a brake lever assembly and a foot-operated brake pedal. The brake force generating mechanism applies a braking force to at least a front wheel or a rear wheel of the vehicle. The brake lever assembly includes a hand-operated lever and a force actuator. The force actuator moves between at least first and second positions so as to selectively actuate the brake force generating mechanism to produce a braking force. The force actuator interacts with the hand-operated lever such that movement of the hand-operated lever moves the force actuator from the first position to at least the second position. The force actuator also interacts with the brake pedal, which are coupled together by a cable. Movement the brake pedal also moves the force actuator from the first position to the second position.

13 Claims, 11 Drawing Sheets

FOREIGN PATENT DOCUMENTS

| | | | |
|---|---|---|---|
| JP | 10-181546 A | * | 7/1998 |
| JP | 2000-313318 | | 11/2000 |
| JP | 2001-088766 | | 4/2001 |
| JP | 2001 278169 | | 10/2001 |
| JP | 2001-278169 A | * | 10/2001 |

* cited by examiner

BRAKE SYSTEM FOR STRADDLE-TYPE VEHICLE

CROSS-REFERENCE TO RELATED APPLICATIONS

This application is based on and claims priority under 35 U.S.C. §119(a)-(d) to Japanese Patent Application No. 2004-368909, filed Dec. 21, 2004, and to Japanese Patent Application No. 2005-334940, filed Nov. 18, 2005, the entire contents of which are hereby incorporated by reference.

BACKGROUND OF THE INVENTION

1. Field of the Invention

The present invention relates to a vehicular brake system comprising a braking force generating mechanism that generates a braking force when either a brake lever or a brake pedal is operated.

2. Description of the Related Art

Brake systems for motorcycles, scooters, ATVs, and the like often include a brake lever, a master cylinder, and one or more sets of brake calipers and brake discs associated with one or more wheels of the vehicle. For example, with a hydraulic brake system, such as the type disclosed in Japanese Patent Publication No. JP-A-2001-88766, when the front brake lever is operated (e.g., squeezed), a master cylinder assembly generates sufficient hydraulic pressure to cause a first set of brake calipers to close about a front brake disc and to cause a second set of brake calipers to close about a rear brake disc. Similarly, when the rear brake lever is operated, the master cylinder assembly generates sufficient hydraulic pressure to cause both sets of brake calipers to close about the front and rear brake discs. With such a brake system, both the front and rear brakes are operated regardless of when either of the brake levers is squeezed.

Some applications also include a brake pedal in addition to a brake lever to operate one or both set of the vehicle's brakes (i.e., the front and rear brakes). For example, an all-terrain vehicle (ATV) often includes a brake pedal in addition to a brake lever to provide the rider with more than one way to operate the brakes. In some uses, such as when traveling over a rough road, a rider may feel uneasy releasing his or her grip to operate the brake lever. In such cases, the rider can operate the brakes using the brake pedal. In other cases, such as when traversing a slope, a rider may want to use his or her leg and foot to help stabilize the vehicle on the slope. As such, the rider can operate the brakes using the brake lever while his or her leg and foot are used of other purposes during such maneuvers.

Japanese Patent Publication No. A-2000-313318 discloses a brake system in which the rear brakes are operated by either a hand-operated brake lever or a foot-operated brake pedal. The brake pedal includes an arm, which when moves, pushes a piston rod of an associated master cylinder. The master cylinder generates hydraulic pressure in the brake fluid which causes the rear brake calipers to close about the rear brake discs. The brake lever is connected to the arm by a wire cable. The wire transmits the force applied to squeeze the brake lever the arm, which in turn pushes the piston rod to apply a braking force on the rear wheels.

Rider acceptance of wire-operated brake system varies from individual to individual. Some riders dislike the feel of such systems when a hand lever is used to operate the brake. Over time, the wire lengthens and should be re-stretched to provide the original correlation between the braking force and the force applied to the brake lever. Additionally, it may become harder to squeeze the brake lever as the wire cable becomes dirty and warn. Accordingly, some riders prefer to use the brake pedal, rather than the brake lever, to operate the rear brakes.

SUMMARY OF THE INVENTION

An aspect of the present invention involves brake system for a vehicle including at least front and rear wheels. The brake system comprises a braking force generating mechanism, a brake lever assembly and a foot-operated brake pedal. The brake force generating mechanism applies a braking force to at least a front wheel or a rear wheel of the vehicle. The brake lever assembly includes a hand-operated lever and a force actuator. The force actuator moves between at least first and second positions so as to selectively actuate the brake force generating mechanism to produce a braking force. The force actuator interacts with the hand-operated lever such that movement of the hand-operated lever moves the force actuator from the first position to at least the second position. The force actuator also interacts with the brake pedal, which are coupled together by a cable. Movement the brake pedal also moves the force actuator from the first position to the second position.

The force applied to the brake pedal is transmitted by cable rather than by a hydraulic system, thereby reducing the cost of the brake system and simplifying its construction. This configuration also provides for increased flexibility regarding the layout of vehicle components around the brake pedal and the brake system. Additionally, because a rider usually has less sensitivity when operating the foot pedal as compared to a hand lever to an increase in operational force required and increased slop in the cable due to stretching, more riders will feel comfortable using either the foot pedal or the hand lever to operate the vehicle brakes. Moreover, the rider experiences a stiffer feeling (i.e., a more responsive feeling) when operating the brake system using the brake lever because the brake lever interacts with the force actuator without the force being transmitted through a cable.

Another aspect of the present invention involves a brake system for a vehicle including at least front and rear wheels. The brake system comprises a brake mechanism, which applies a braking force to at least a front wheel or a rear wheel of the vehicle, a brake lever, a brake pedal and a force actuator. The force actuator is arranged to selectively operate the brake mechanism to produce a braking force, and is coupled to the brake lever and to the brake pedal. Movement of brake lever moves the force actuator and movement of the brake pedal moves the force actuator. The force actuator is remotely disposed relatively to the brake pedal and is arranged to directly interact with a component of the brake mechanism.

In accordance with an additional aspect of the present invention, a brake system is provided for a vehicle including a handlebar and at least front and rear wheels. The brake system comprises a hydraulic brake mechanism that includes a master cylinder. The master cylinder applies a braking force to at least a front wheel or a rear wheel of the vehicle. A brake lever is disposed next to the master cylinder on the vehicle handlebar, and a force actuator is arranged to selectively operate the master cylinder to produce a braking force. The force actuator is arranged such that movement of the brake lever moves the force actuator to operate the master cylinder.

In a preferred embodiment, the brake system also includes a brake pedal. The brake pedal and the brake lever, more preferably, can operate independently of each other to move the force actuator and operate the brake system. In this manner, the brake lever do not have to also move the brake pedal when moving the force actuator, and vise versa.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following eight figures.

DETAILED DESCRIPTION OF THE PREFERRED EMBODIMENT

Figure 1:
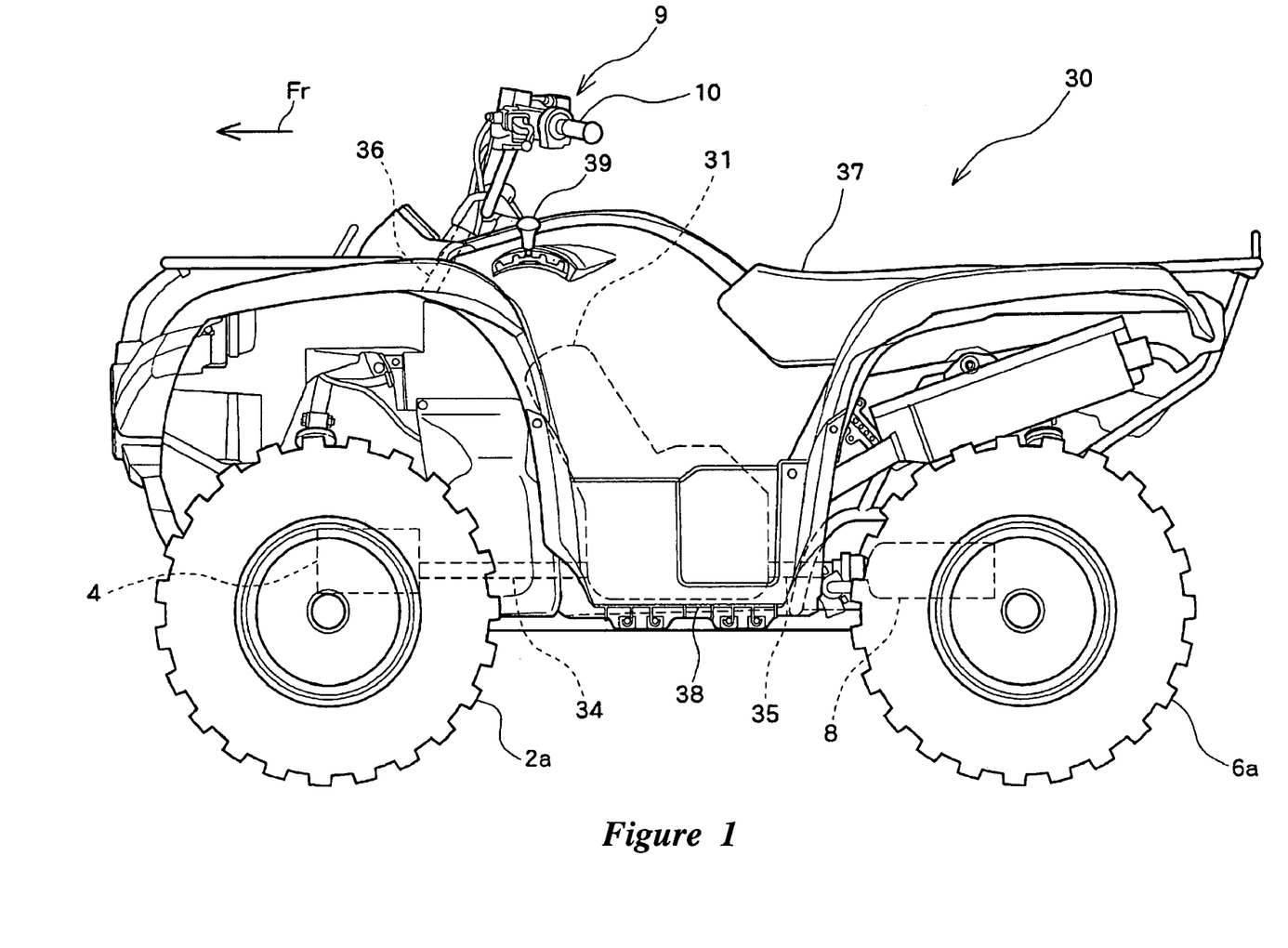
FIG. 1 is a left side view showing a small-sized four-wheel vehicle provided with a brake system configured in accordance with a first preferred embodiment of the present invention.
Figure 2:
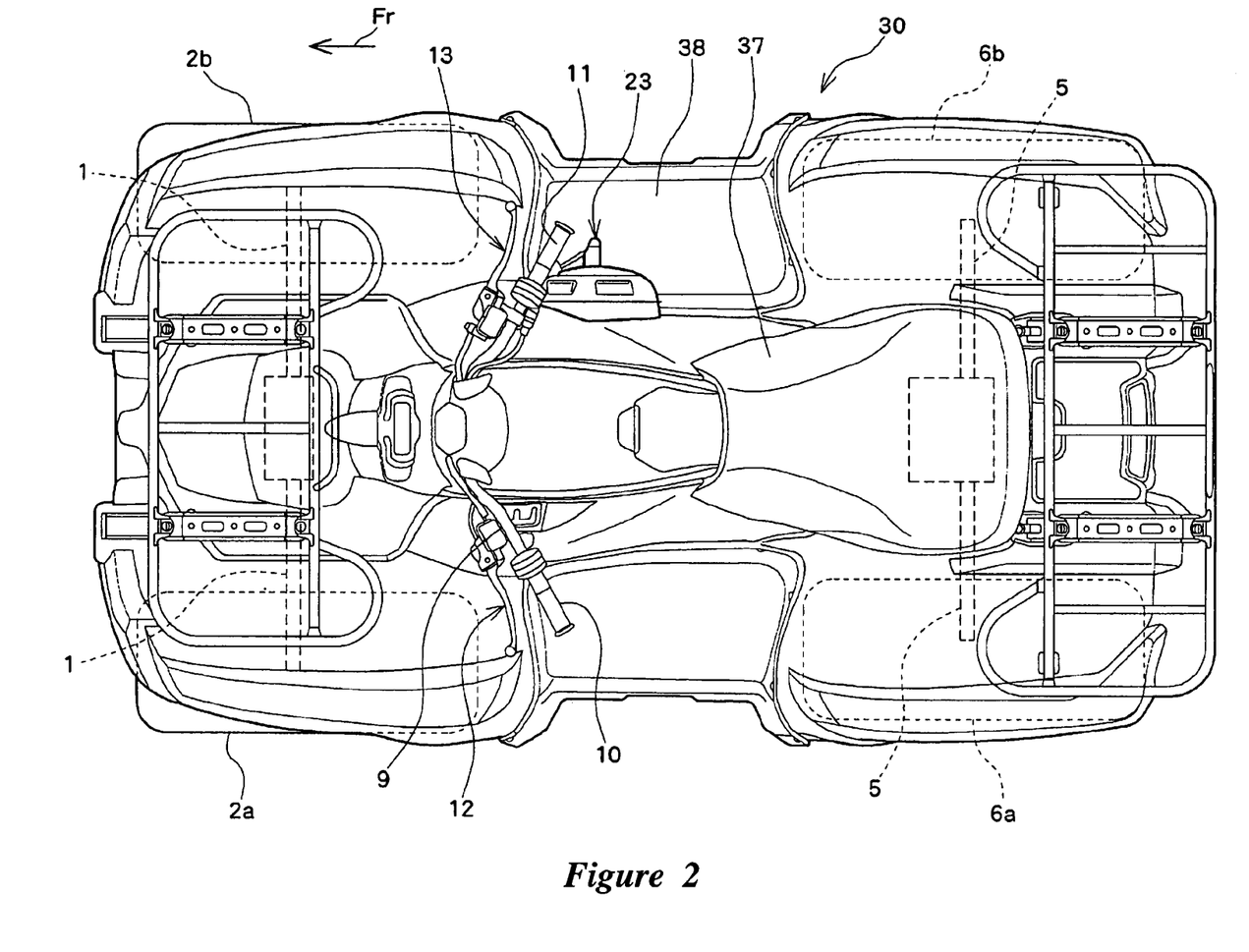
FIG. 2 is a top plan view showing the small-sized four-wheel vehicle of FIG. 1.

Embodiments of the invention will be described below with reference to the drawings. FIG. 1 is a side view showing a small-sized four-wheel vehicle 30 being an example of a straddle-type vehicle that includes a vehicular brake system configured in accordance with a first embodiment of the invention. FIG. 2 is a plan view showing the small-sized four-wheel vehicle 30. While the present brake system is illustrated in the context of an all-terrain vehicle, the brake system and aspects and features thereof can be used with other types of vehicles as well, including, without limitation, motorcycles, scooters, motorized bicycles, and the like.

The small-sized four-wheel vehicle 30 is a rough terrain traveling vehicle used for sport traveling on a rough terrain, for farm work, or for like purposes. The small-sized four-wheel vehicle 30 comprises an engine unit 31 preferably arranged centrally within a vehicle body. The engine unit 31 preferably includes an internal combustion engine and a variable speed transmission; however, the brake system can be used on vehicles using other types of prime movers (e.g., electric motors) and transmissions. The engine unit 31 preferably drives all four wheels, which include left and right front wheels 2a, 2b arranged below a front portion of the vehicle body, and left and right rear wheels 6a, 6b arranged below a rear portion of the vehicle body. Coupled to the engine unit 31 are a front wheel output shaft 34 and a rear wheel output shaft 35. Each output shaft 34, 35 preferably extends generally parallel to a longitudinal axis of the vehicle.

In the illustrated embodiment, a front end of the front wheel output shaft 34 is connected to a front wheel differential mechanism 4. Front wheel axles 1, 1 are connected to the front wheel differential mechanism 4 and extend in a left and right directions, respectively. The front wheel axles 1, 1 are connected to the left and right front wheels 2a, 2b to transmit a driving force from the engine unit 31 to the front wheels. In this manner, the driving force supplied by the engine unit 31 is distributed and transmitted to the left and right front wheels 2a, 2b by the front wheel differential mechanism 4.

A rear end of the rear wheel output shaft 35 is connected to a rear wheel differential mechanism 8. Rear wheel axles 5, 5 are connected to the rear wheel differential mechanism 8 and extend in the left and right directions therefrom. The rear wheels axles 5, 5 are connected to the left and right rear wheels 6a, 6b. The driving force output from the engine unit 31 also is distributed and transmitted to the left and right rear wheels 6a, 6b by the rear wheel differential mechanism 8.

As seen in FIG. 1, the vehicle includes a handlebar 9 that extends in the left and right directions. A rider uses the handlebar to steer the vehicle and, more precisely, to steer at least the front wheels 2a, 2b. A steering shaft 36 extends obliquely downward and is rotationally supported on a vehicle frame (not shown). A central section of the handlebar 9 preferably is connected to an upper end of the steering shaft 36.

A left grip 10 is mounted on left end of the handlebar 9 and a right grip 11 is mounted on a right end of the handlebar 9. Also, mounted to the handlebar 9, just to the right of the left grip 10, is a rear wheel brake lever 12 that is manually operated to apply a braking force to the rear wheels 6a, 6b. Also, mounted to the handlebar 9 just to the left of the right grip 11 is a front wheel brake lever 13 that is manually operated to apply a braking force to the front wheels 2a, 2b.

A seat 37 is arranged on the vehicle at a location behind the handlebar 9. In the illustrated embodiment, the seat is a straddle-type seat that preferably has a saddle-like configuration to accommodate at least one rider. The seat is arranged obliquely upward of the engine unit 31. Footboards 38 are arranged below the left and right of the seat 37 and at a distance relative to the seat 37 to permit a rider to put his or her feet on the footboards 38 when straddling the seat 37.

A brake pedal 23 is disposed toward an inner side of the right foot board 38 that is foot-operated to apply a braking force to the rear wheels 6a, 6b (see FIG. 2). In addition, provided below the left grip 10 is a change lever 39 that switches transmission gears of the engine unit 31.

Figure 3:
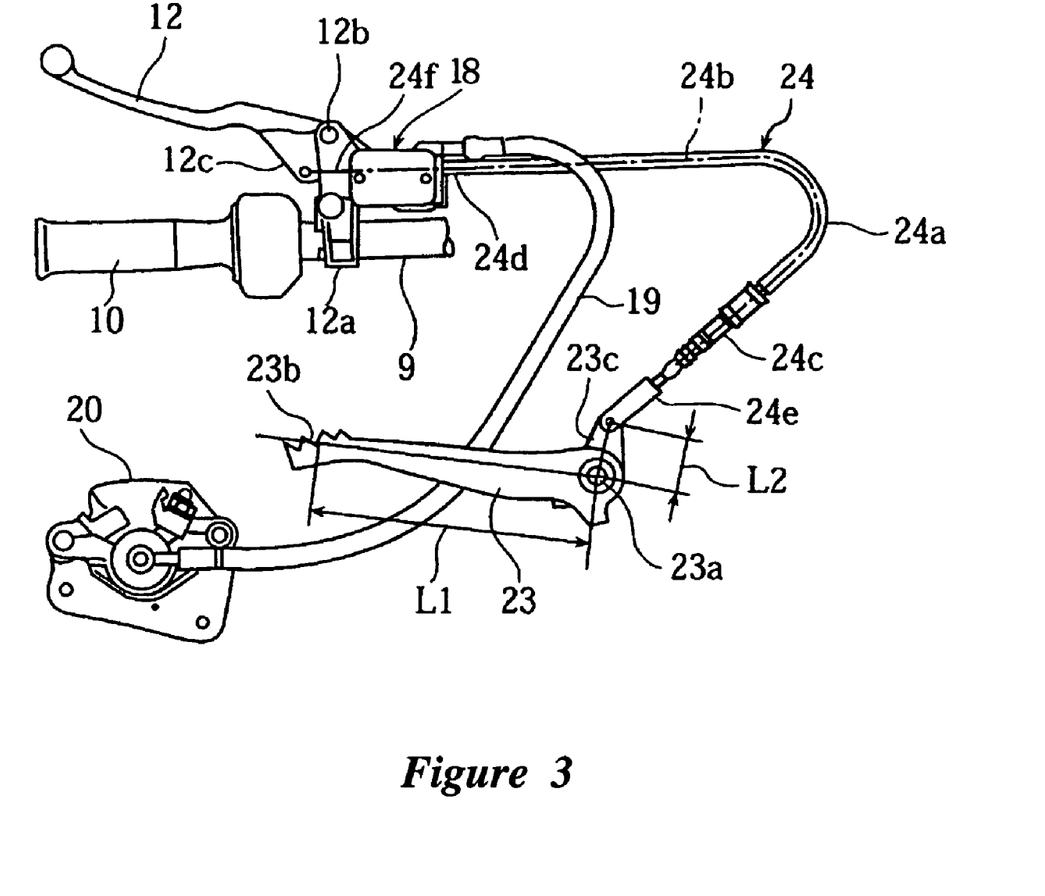
FIG. 3 is a schematic view showing a fundamental construction of the brake system.

The embodiment of the brake system provided on the small-sized four-wheel vehicle 30 will now be described in detail with reference initially to FIGS. 3 and 4. FIG. 3 is a schematic view showing a fundamental construction of the brake system and FIG. 4 is a schematic view showing an arrangement and a construction of the brake system as employed on the vehicle 30.

Figure 4:
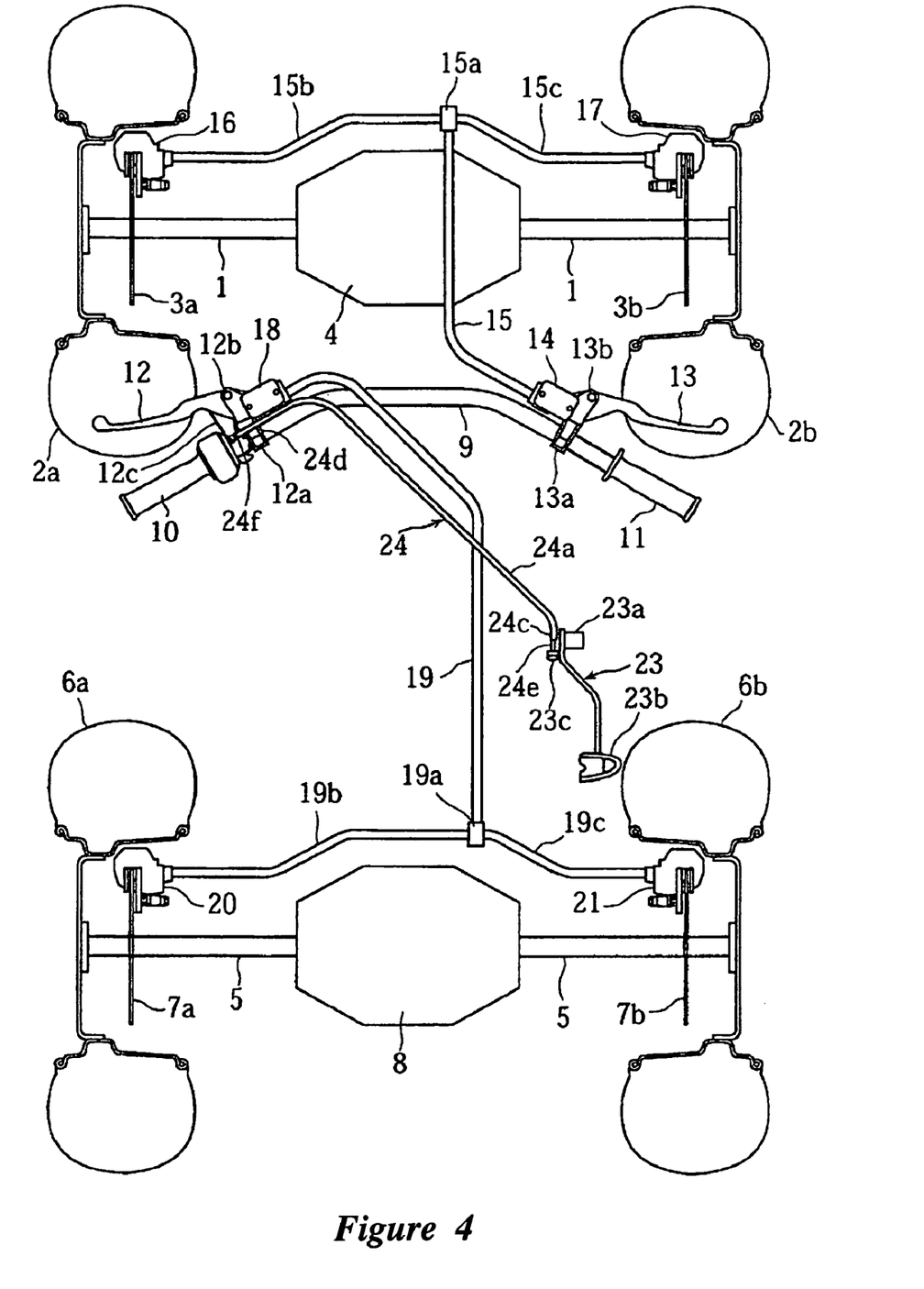
FIG. 4 is a schematic view showing an arrangement and a construction of the brake system relative to the four wheels of the vehicle of FIG. 1.

As seen in FIG. 4, the left and right front wheels 2a, 2b are fixed to the lateral ends of the front wheel axles 1,1. Front wheel brake disks 3a, 3b preferably are arranged inside the left and right front wheels 2a, 2b. The front wheel brake disks 3a, 3b are mounted to the front wheel axles 1, 1 so as to rotate with the front wheel axles 1, 1. The front wheel brake disks 3a, 3b rotate with the front wheels 2a, 2b when a driving force is transmitted to the front wheels 2a, 2b from the front wheel axles 1, 1.

Also, the left and right rear wheels 6a, 6b are connected and fixed to lateral ends of the rear wheel axles 5, 5. Rear wheel brake disks 7a, 7b preferably are arranged inside wheels of the left and right rear wheels 6a, 6b. The rear wheel brake disks 7a, 7b are mounted to the rear wheel axles 5, 5 so as to rotate with the rear wheel axles 5, 5. The rear wheel brake disks 7a, 7b rotate with the rear wheels 6a, 6b when a driving force is transmitted to the rear wheels 6a, 6b.

In addition, in FIG. 4, the reference numeral 9 denotes the handlebar and the left grip 10 and the right grip 11 are mounted to the left and right ends of the handlebar 9 as described above.

A right holder 13a of a right brake lever assembly is mounted to a portion of the handlebar 9 adjacent to the right grip 11. The front wheel brake lever 13 is mounted to the handlebar 9 by the right holder 13a so that it can pivot about a support pin (support shaft) 13b and be squeezed toward the handlebar 9.

A front wheel master cylinder 14 is also mounted to the right holder 13a. The master cylinder 14 generates hydraulic pressure when the front wheel brake lever 13 is squeezed and rotated toward the handlebar 9. The front wheel master cylinder 14 is connected to left and right front wheel brake calipers (braking members) 16, 17 through a hydraulic hose 15. Each of the front wheel brake calipers 16, 17 are positioned about the respective left and right front wheel brake disks 3a, 3b to apply a braking force to the front wheels 2a, 2b. In addition, the hydraulic hose 15 branches into left and right branch pipes 15b, 15c with a branch joint 15a therebetween. The branch pipes 15b, 15c connected to the respective left and right brake calipers 16, 17. The front wheel master cylinder 14, the brake hose 15, the left and right front wheel brake calipers 16, 17, etc. constitute a front wheel braking force generating mechanism that generates hydraulic pressure when the front wheel brake lever 13 is operated.

A left holder 12a of the rear brake lever assembly is mounted to a portion of the handlebar 9 adjacent to the left grip 10. The rear wheel brake lever 12 is mounted to the handlebar 9 by the left holder 12a so that it can pivot on a support pin (support shaft) 12b.

Mounted to the left holder 12a is a rear wheel master cylinder 18 that generates hydraulic pressure when the rear wheel brake lever 12 is manually operated. The rear wheel master cylinder 18 is connected to left and right rear wheel brake calipers (braking members) 20, 21 through a hydraulic hose 19. Each of the rear wheel brake calipers 20, 21 are positioned about respective left and right rear wheel brake disks 7a, 7b to apply a braking force to the rear wheels 6a, 6b. In addition, the hydraulic hose 19 branches into left and right branch pipes 19b, 19c with a branch joint 19a therebetween. The branches 19b, 19c are connected to the respective rear wheel brake calipers 20, 21.

A brake pedal 23 is able to swing vertically about a pivot shaft 23a. In the illustrated embodiment, the brake pedal 23 extends rearward from the pivot shaft 23a and is formed with a tread part or cleat 23b at a rear end thereof.

The brake pedal 23 and the rear wheel brake lever assembly (which is denoted generally as reference number 12 FIGS. 5-8) are connected to each other by a brake cable (wire cable) 24. In the illustrated embodiment, the brake cable 24 is structured such that an inner cable 24b is inserted and arranged in an outer cable 24a to be axially movable relative thereto, such as in a Bowden-wire type cable arrangement. The outer cable 24a has its rear end (an end toward the brake pedal 23) 24c supported and fixed by a vehicle body (not shown) and has its front end (an end toward the rear wheel brake lever 12) 24h supported and fixed by the left holder 12a of the handlebar 9.

The inner cable 24b has its rear end (an end toward the brake pedal 23) 24e connected to a drive arm 23c formed at a base end of the brake pedal 23. A front end (an end toward the brake pedal 23) 24f of the cable 24 is connected to a driven arm 12c provided at a base end of the rear brake lever assembly 12. In this manner, a manipulating force (torque) applied to the foot-operated brake pedal 23 is transmitted to the hand-operated brake lever assembly 12 through the brake cable 24.

The rear wheel master cylinder 18, the brake hose 19, the left rear wheel brake caliper 20, the right rear wheel brake caliper 21, the brake cable 24, etc. constitute a rear wheel braking force generating mechanism that generates hydraulic pressure when the rear wheel brake lever assembly 12 is manually operated by the brake cable 24 using the brake pedal 23 or by the brake lever.

Figure 5:
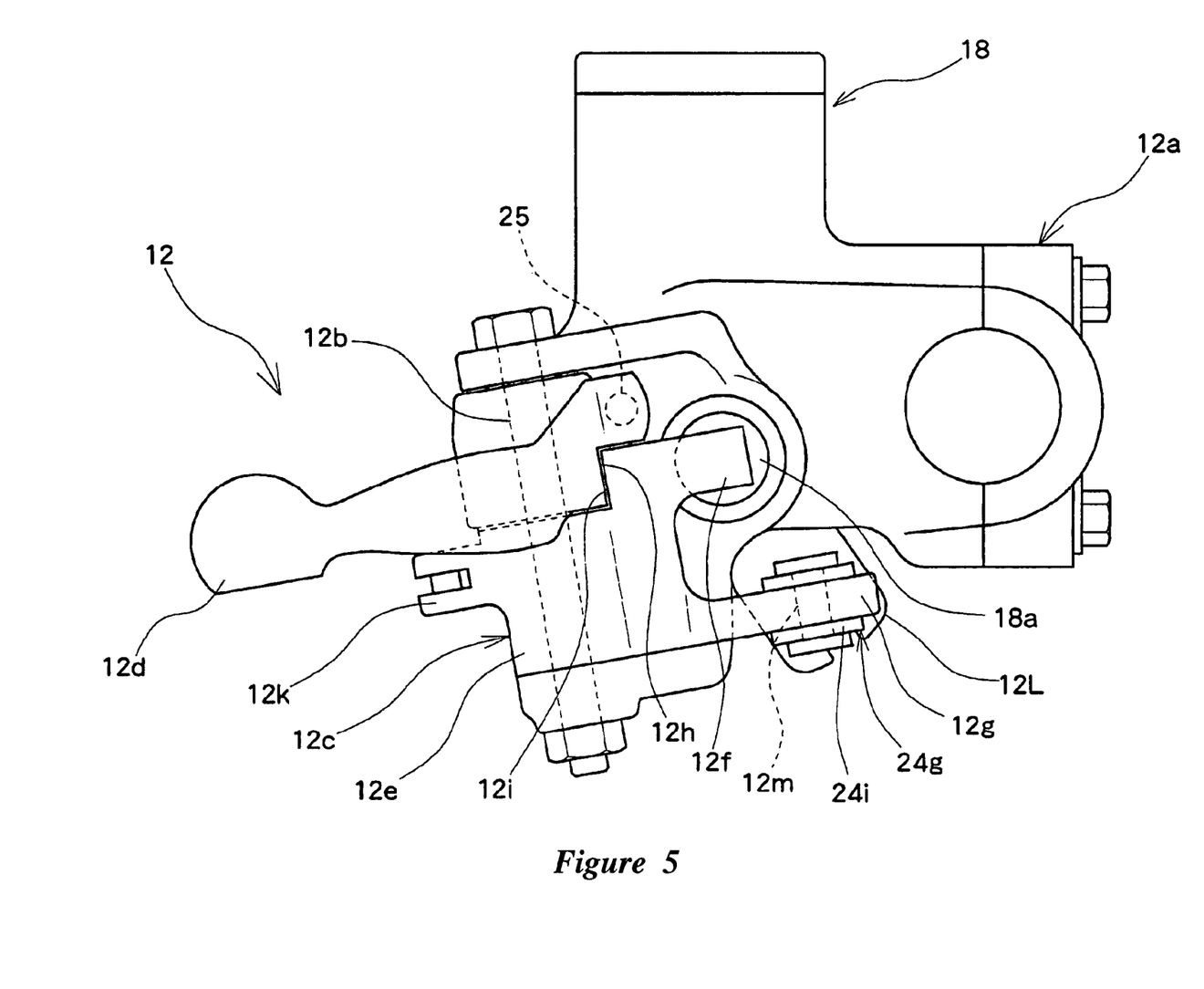
FIG. 5 is an enlarged side view showing a rear wheel brake lever assembly of the brake system shown in FIG. 1.
Figure 6:
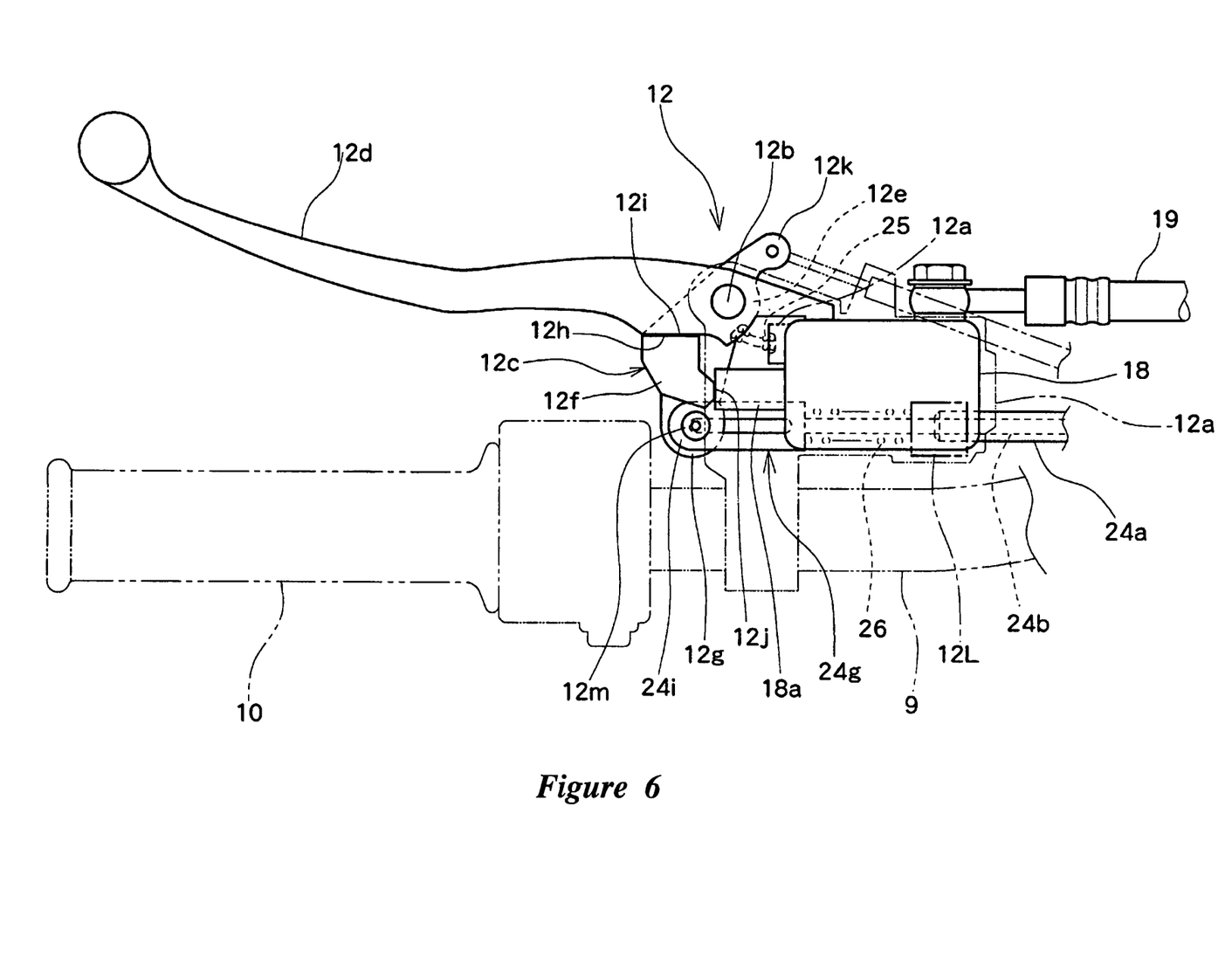
FIG. 6 is a top plan view showing the rear wheel brake lever assembly of FIG. 5.
Figure 7:
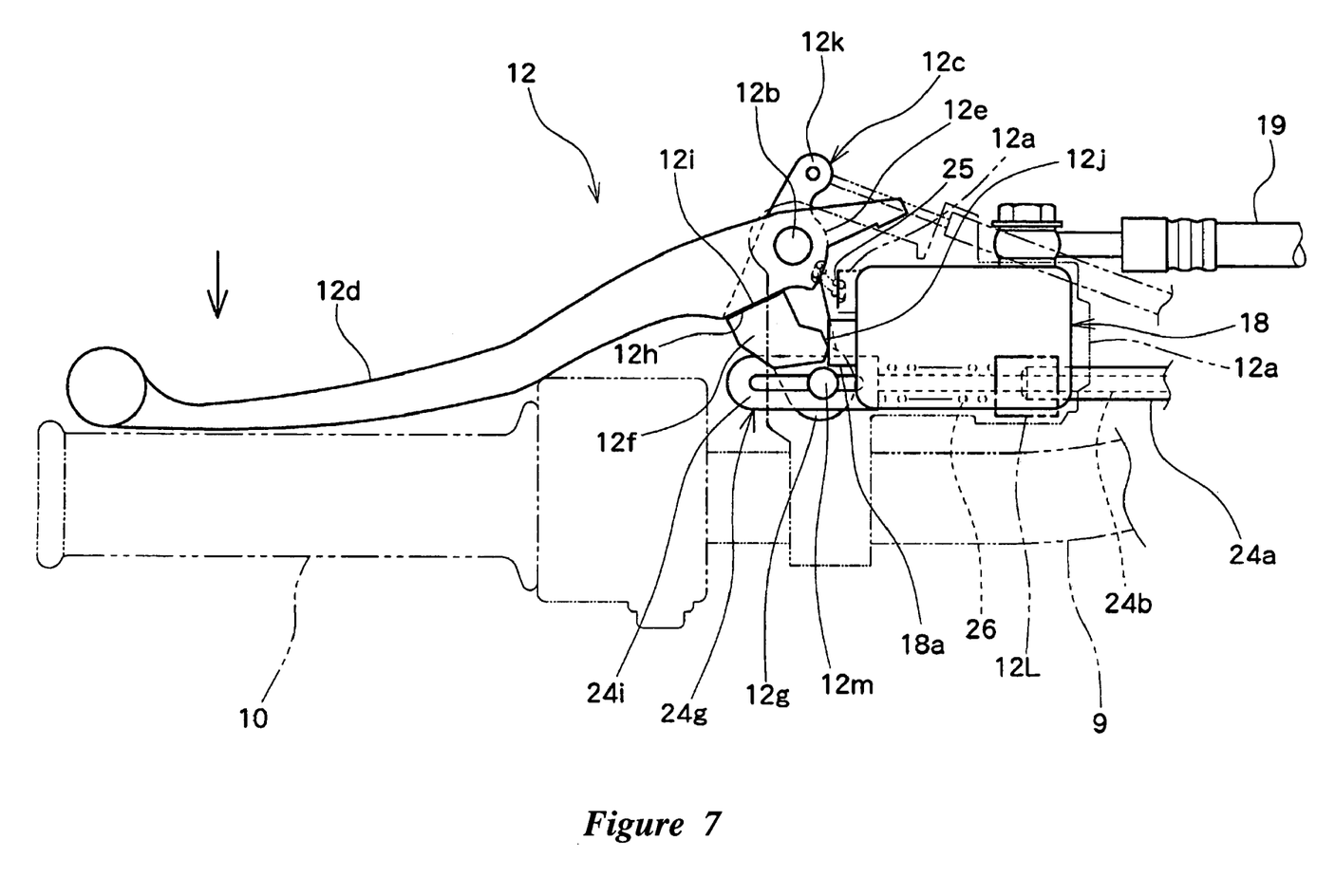
FIG. 7 is a top plan view showing the rear wheel brake lever assembly of FIG. 6 when using the brake lever to brake.
Figure 8:
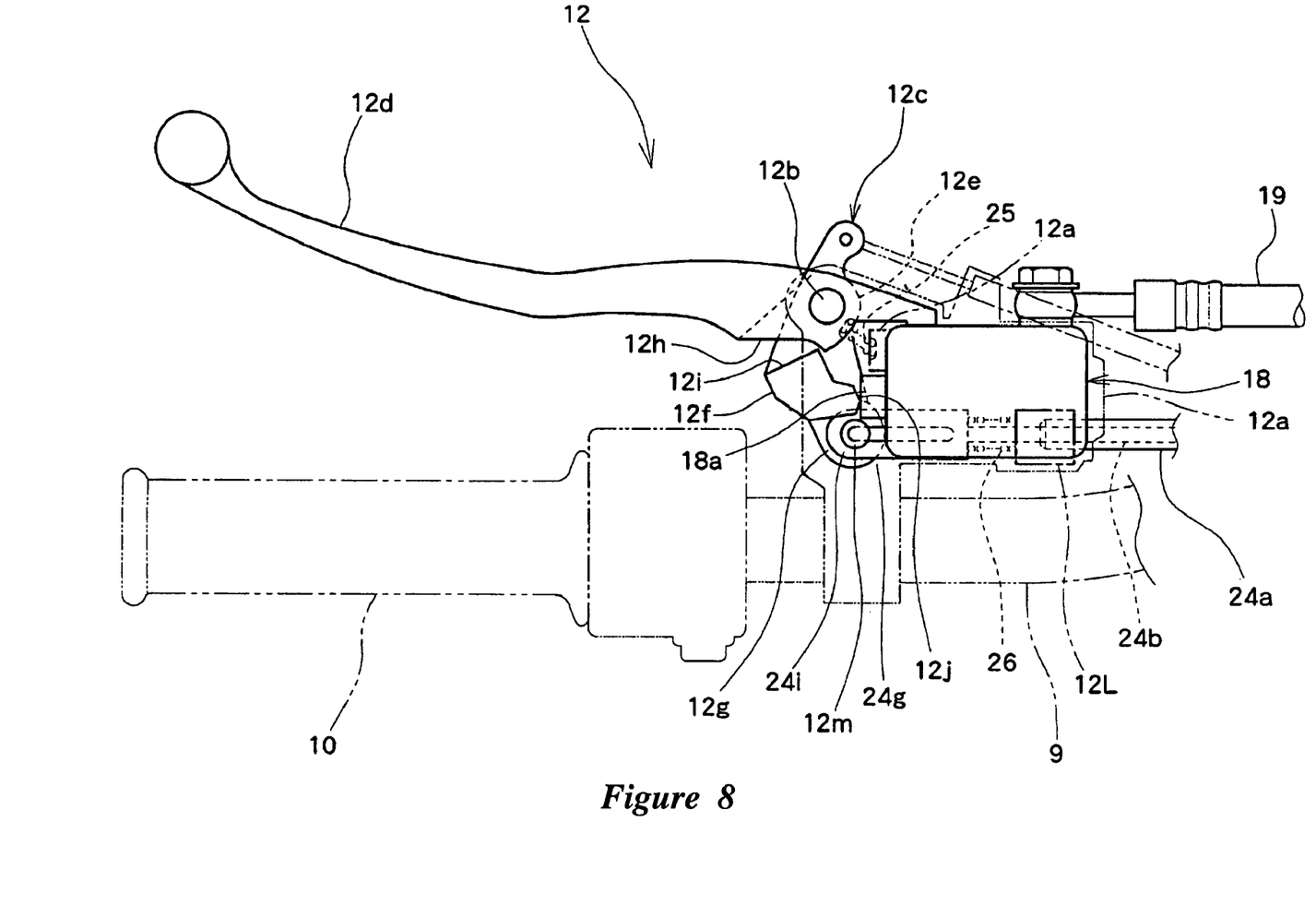
FIG. 8 is a top plan view showing the rear wheel brake lever assembly of FIG. 6 when using the brake pedal to brake.

The specific construction of the brake lever assembly 12 will now be described in further detail with primary reference to FIGS. 5 through 8. FIG. 5 is a left side view showing the rear wheel brake lever assembly 12 and FIG. 6 is a plan view thereof. FIG. 7 is a plan view showing the rear wheel brake lever assembly 12 in a state of being manually operated using the brake lever and FIG. 8 is a plan view showing the rear wheel brake lever assembly 12 when the brake pedal 23 is foot-operated. In addition, the illustration of the handlebar 9 and the left grip 10 is omitted in FIG. 5. Also, the left grip 10, the handlebar 9, and the left holder 12a are indicated by dotted lines in FIGS. 6 to 8.

The rear wheel brake lever assembly 12 comprises a lever body 12d, on which a rider places one or more fingers for manipulation. The lever body 12d has the support pin (support shaft) 12b inserted through a base end thereof and rotates about the support pin 12b when squeezed or otherwise operated by a rider.

Also, as described above, the rear wheel brake lever assembly 12 comprises the driven arm 12c, which constitutes a force actuator in the illustrated embodiment. The driven arm 12c comprises a pin insertion portion 12e, through which the support pin 12b is inserted, and which is disposed axially adjacent to the lever body 12d. The driven arm 12c also includes a force transmitting portion 12f and a pedal input portion 12g (see FIG. 5). The force transmitting portion 12f is positioned radially outwardly of the support pin 12b. Also, the pedal input portion 12g is likewise positioned radially outwardly of the support pin 12b and toward an end of the support pin 12b relative to the force transmitting portion 12f (toward the bottom end of the pin 12b in the illustrated embodiment). Because the pedal input portion 12g, which is pulled by the wire cable, is positioned outwardly in a radial direction from the support shaft, distortion of the force actuator caused when pulled by the wire cable is suppressed.

The master cylinder 18 includes a pushed portion 18a projecting toward the left grip 10 (leftward). The lever body 12d, the force transmitting portion 12f of the driven arm 12c, and the pushed portion 18a of the master cylinder 18 are arranged in this order circumferentially about the support pin 12b (see FIG. 6). In addition, when pushed at an end surface, the pushed portion 18a of the master cylinder 18 is contracted toward the master cylinder 18 (rightward) by the pushing force to generate hydraulic pressure in the brake liquid. Also, when the pushing force is released, the pushed portion 18a of the master cylinder 18 projects again leftward.

The lever body 12d is formed with a pushing surface 12h that preferably extends parallel to an axis of the support pin 12b and faces toward the driven arm 12c. The force transmitting portion 12f of the driven arm 12c is formed with a pushed surface (a lever manipulation input surface) 12i. The pushed surface 12i also preferably extends parallel to an axis of the support pin 12b and opposes to the pushing surface 12h of the lever body 12d. Further, the force transmitting portion 12f is formed with a master cylinder pushing surface 12j that is opposed to the end surface of the pushed portion 18a of the master cylinder 18.

As shown in FIG. 7, when the lever body 12d is pivoted (e.g., by squeezing the lever body 12d to rotate counterclockwise in the drawing), the pushing surface 12h of the lever body 12d pushes the pushed surface 12i provided on the driven arm 12c. Thereby, the driven arm 12c is also pivoted about the support pin 12b. At this time, the master cylinder pushing surface 12j of the driven arm 12c pushes the end surface of the pushed portion 18a of the master cylinder 18. Thereby, hydraulic pressure is generated in the brake liquid in the master cylinder 18, so that a braking force is applied to the rear wheels 6a, 6b.

Arranged between the left holder 12a and the lever body 12d is a spring 25 that biases the lever body 12d in the direction of clockwise rotation in the figure (in a direction opposed to a direction of rotation to apply a braking force). Therefore, when a rider releases the lever body 12d, the lever body 12d pivots to return to its original position (see FIG. 6). At this time, the master cylinder pushing surface 12j no longer pushes the pushed portion 18a of the master cylinder 18, and the driven arm 12c turns in the direction opposed to the direction at the time of braking operation to return to its original position. An bias member within the master cylinder preferably causes the pushed portion 18a and the lever body 12d to return to their respective original positions. In addition, the inner cable 24b connected to the driven arm 12c is not operated at the time of the braking operation performed by the rear wheel brake lever 12, which is described later in detail.

A connecting construction of the driven arm 12c and the inner cable 24b will now be described in detail. The inner cable 24b is connected to the pedal input portion 12g, and the inner cable 24b pulls the pedal input portion 12g when the brake pedal 23 is actuated. On the other hand, the inner cable 24b is connected to the pedal input portion 12g so as not to be pushed by the pedal input portion 12g when the rear wheel brake lever body 12d is manipulated.

In the illustrated embodiment, an end of the outer cable 24a toward the rear wheel brake lever 12 is supported on a cable support 12L formed integral with the left holder 12a. An engagement pin 12m is inserted through the pedal input portion 12g of the driven arm 12c. The inner cable 24b projects farther leftward from the end of the outer cable 24a and a driven arm engagement member 24g, which engages the engagement pin 12m, is mounted to an end of the inner cable 24b.

Figure 9:
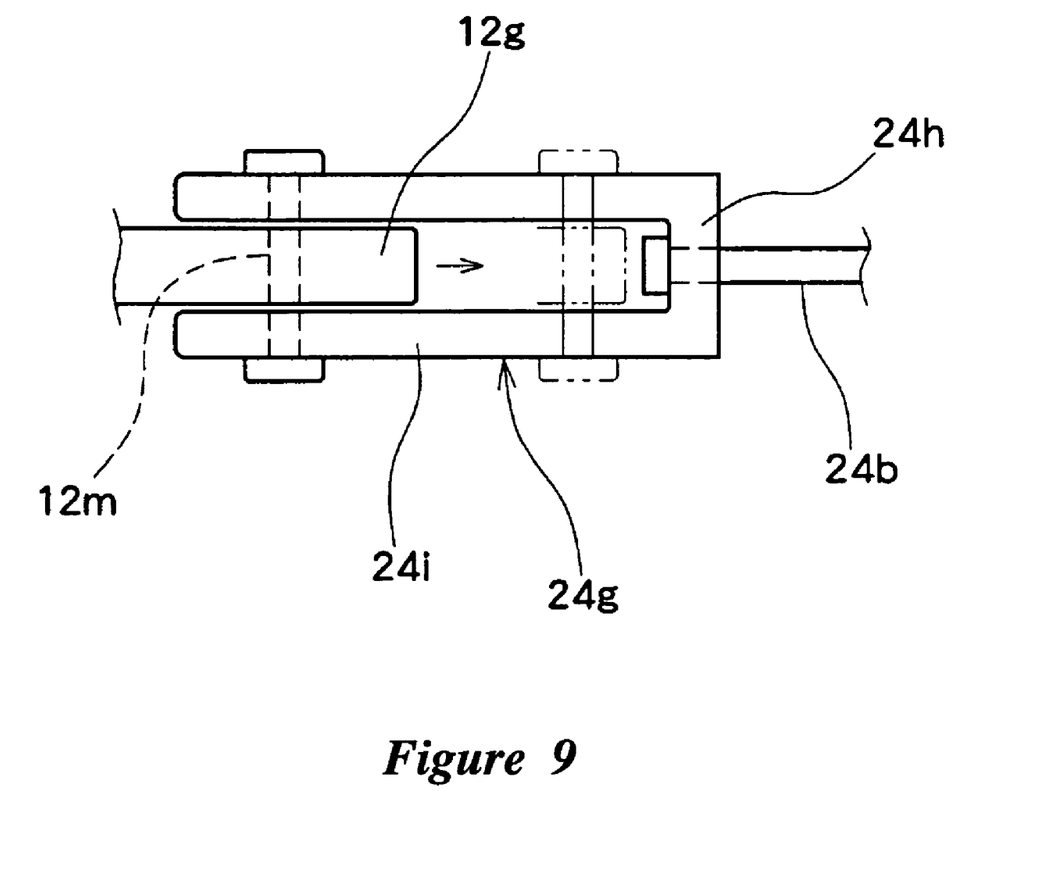
FIG. 9 is an enlarged view showing a lost motion connection between an end of a cable, which is coupled to the brake pedal, and a force actuator of the brake lever assembly shown in FIG. 6.

FIG. 9 is a view showing a manner in which the driven arm engagement member 24g engages with the pedal manipulation input portion 12g to provide a lost-motion connection. The driven arm engagement member 24g includes a cable mount 24h, to which the inner cable 24b is mounted, and a pair of upper and lower pin engaging portions 24i that are provided upright on an edge of the cable mount 24h to extend toward the driven arm 12c (leftward). The pin engaging portions 24i are formed with slots, which extend in a direction (the left to right direction), in which the pin engaging portions 24i extend. The pair of upper and lower pin engaging portions 24i interpose therebetween the pedal input portion 12g and ends of the engagement pin 12m project vertically from the slots of the pin engaging portions 24i. The pedal input portion 12g can move together with the engagement pin 12m along the slots formed on the pin engaging portions 24i in the left and right direction (see FIG. 7).

Therefore, when the driven arm 12c is turned this side (direction of right-handed rotation) at the time of operation of the rear wheel brake lever 12, the engagement pin 12m moves rightward along the slots formed on the pin engaging portions 24i and the driven arm 12c operates independently of the pin engaging portions 24i and the inner cable 24b (see two-dot chain lines in FIGS. 7 and 9). In addition, the ends of the engagement pin 12m are formed to be larger in diameter than an intermediate portion thereof in order to prevent coming-off.

When the brake pedal 23 is manipulated, the inner cable 24b and the driven arm engagement member 24g move rightward (as viewed from the perspectives of FIGS. 6 and 8). At this time, the engagement pin 12m engages with left ends of the slots formed on the pin engaging portions 24i and the pedal input portion 12g is pulled rightward. Thereby, the driven arm 12c is pivoted counterclockwise and the master cylinder pushing surface 12j pushes the end surface of the pushed portion 18a of the master cylinder 18. As a result, hydraulic pressure is generated in the brake liquid in the master cylinder 18, so that a braking force is applied to the rear wheels 6a, 6b. In addition, when the brake pedal 23 is manipulated, the pushed surface 12i of the driven arm 12c separates from the pushing surface 12h of the lever body 12d and the driven arm 12c is turned independently of the lever body 12d.

Arranged between the cable mount 24h of the driven arm engagement member 24g and the cable support 12L is a spring 26 that biases the driven arm engagement member 24g leftward. Therefore, when the brake pedal 23 is released, the inner cable 24b together with the driven arm engagement member 24g moves leftward to return to its original position. Also, the master cylinder pushing surface 12j is pushed to the pushed portion 18a of the master cylinder 18 and the driven arm 12c turns in the direction (clockwise direction) opposed to a direction of turning at the time of braking operation to return to its original position.

In addition, the driven arm 12c preferably includes a change lever connecting portion 12k, which is connected to the change lever 39 through a length of wire, on a side thereof opposed to the force transmitting portion 12f with the support pin 12b therebetween. In one embodiment, the change lever connecting portion 12k interacts with a portion of the change lever 39 (e.g., a lock-out portion) when the brake pedal 23 or the lever body 12d is operated and the driven arm 12c is turned. In this manner, the change lever 39 cannot be operated to move into a reverse drive position (or a park position) without fist applying the brakes.

With the brake system, when the front wheel brake lever 13 is operated, the front wheel master cylinder 14 generates hydraulic pressure and the hydraulic pressure is transmitted to the left and right front wheel brake calipers 16, 17 through the hydraulic hose 15. The front wheel brake calipers 16, 17 are disposed about the front wheel brake disks 3a, 3b to apply a braking force to the front wheels 2a, 2b.

On the other hand, when the rear wheel brake lever 12 is operated, the rear wheel master cylinder 18 generates hydraulic pressure and the hydraulic pressure is transmitted to the left and right rear wheel brake calipers 20, 21 through the hydraulic hose 19. The rear wheel brake calipers 20, 21 are disposed about the rear wheel brake disks 7a, 7b to apply a braking force to the rear wheels 6a, 6b.

Further, when the brake pedal 23 is depressed, the manipulating force thus applied is transmitted to the driven arm 12c of the rear wheel brake lever 12 through the brake cable 24. The driven arm 12c is rotated (counterclockwise) and the master cylinder 18 generates hydraulic pressure so that a braking force is applied to the rear wheels 6a, 6b in the same manner as in the case where the rear wheel brake lever 12 is operated.

In this manner, since the brake pedal 23 and the rear wheel brake lever 12 are connected to each other by the brake cable 24, a braking force can be applied to the rear wheels 6a, 6b both in the case where the rear wheel brake lever 12 is turned and in the case where the brake pedal 23 is depressed. As such, since a manipulating force applied to the brake pedal 23 is transmitted to the driven arm 12c of the manually operated type rear wheel brake lever 12 through the brake cable 24, it is possible to avoid degradation in feeling of manipulation while adopting the brake cable 24, which is liable to slightly stretch upon application of tension. That is, a system, in which a manipulating force is transmitted through a length of brake cable can often involve a reduced feeling of stiffness or responsiveness in the mechanical linkage as compared with a hydraulic system because of a slight extension of an inner cable upon application of tension. Also, friction between an inner cable and an outer cable is responsible for reduction in transmission efficiency of a manipulating force and degradation in feeling of manipulation. This is because it is thought that, for example, a driver feels that a corresponding braking force is not generated when the rider applied force to the brake lever. With the illustrated embodiment, the brake pedal 23 is foot operated so that a manipulating force as input becomes large as compared with that by produced by hand operation. Therefore, freedom in setting a lever ratio $\epsilon$(=arm length L1 of the brake pedal 23/arm length L2 of the drive arm 23c) is high. Accordingly, the feeling of stiffness, the feeling of manipulation, etc. can be improved by appropriately selecting the lever ratio. By, for example, increasing the arm length L2 with the arm length L1 constant to decrease the lever ratio $\epsilon$, influences of extension of the inner cable and friction on an amount of manipulation, which is input by depressing the pedal, become small and feeling of stiffness and feeling of manipulation (i.e., responsiveness) are improved.

Also, the brake pedal 23 is foot-operated by a rider and so a large manipulating force is input as compared with that in the hand operation. Therefore, even in the case where the lever ratio $\epsilon$ is set to be small, increase friction is not as readily felt by the rider when operating the brake pedal.

Figure 10:
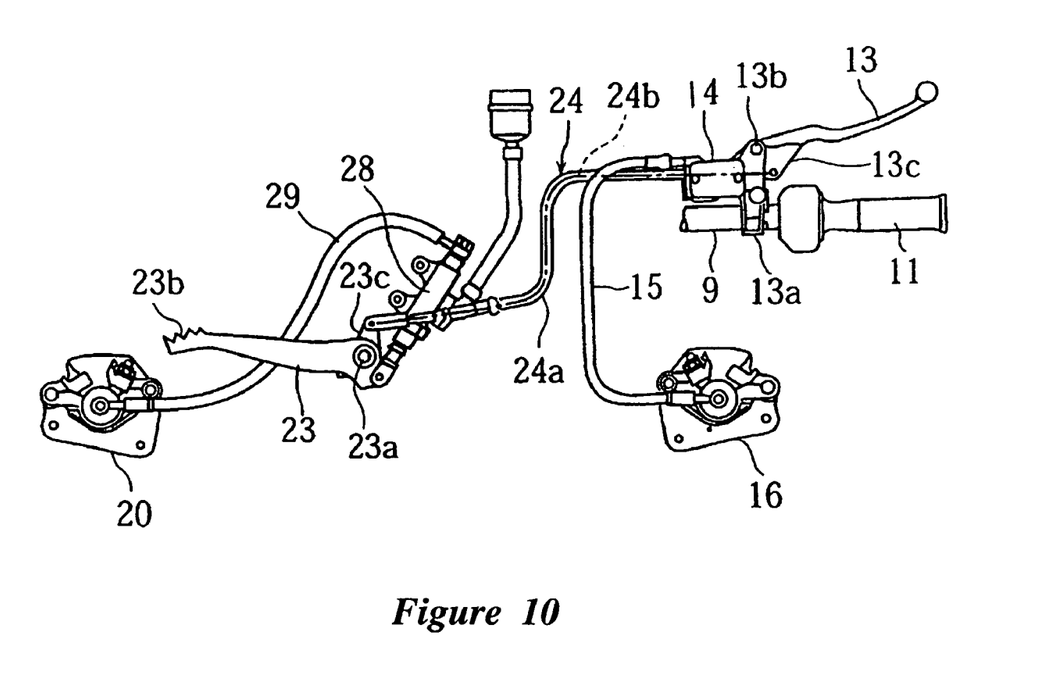
FIG. 10 is a view showing a fundamental construction of a brake system configured in accordance with a second preferred embodiment of the present invention.
Figure 11:
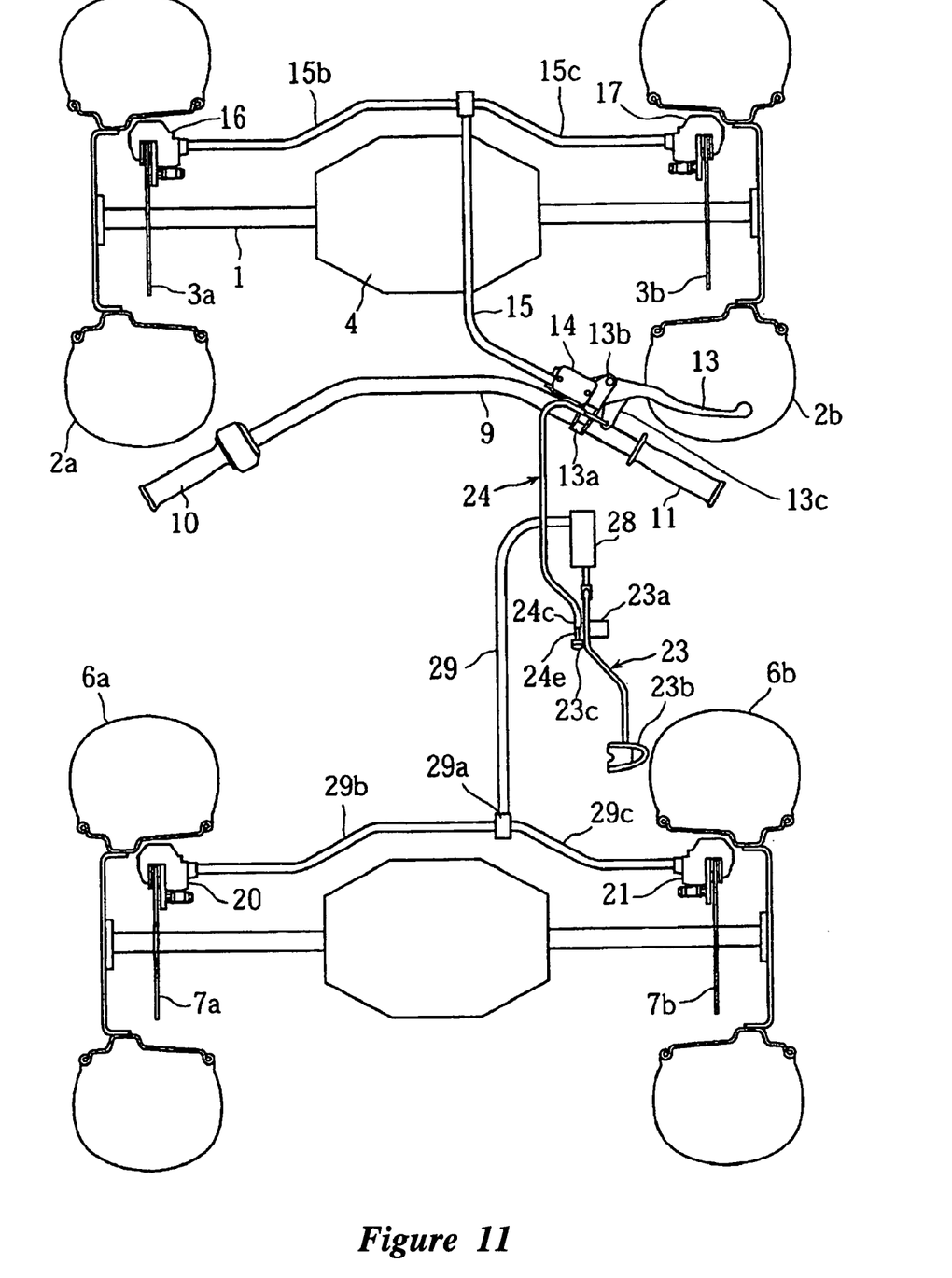
FIG. 11 is a schematic view showing an arrangement and a construction of the brake system of FIG. 10 on a four-wheel vehicle.

A second embodiment of the invention will be described with reference to FIGS. 10 and 11. FIG. 10 is a view showing a fundamental construction of a brake system according to the second embodiment and FIG. 11 is a view showing an arrangement and a construction of the brake system. In the figures, the same parts as those in the first embodiment are denoted by the same reference numerals, and the above-provided explanation apply equally to like components between the embodiments. Also, since a front wheel brake lever 13 is the same in structure as the rear wheel brake lever 12 in the first embodiment, an explanation therefor is not repeated.

The second embodiment is constructed so that a braking force is applied to front wheels 2a, 2b even when either the front wheel brake lever 13 or a brake pedal 23 is manipulated. Also, in the case where the brake pedal 23 is manipulated, a braking force is also applied to rear wheels 6a, 6b in addition to braking of the front wheels 2a, 2b.

Arranged in the vicinity of the brake pedal 23 is a rear wheel master cylinder 28 that generates hydraulic pressure when the brake pedal 23 is operatively turned (e.g., depressed). The rear wheel master cylinder 28 is connected through a hydraulic hose (brake hose) 29, a branch joint 29a, and branch pipes 29b, 29c to left and right rear wheel brake calipers 20, 21.

With the brake system according to the second embodiment, when the front brake lever 13 is operated (e.g., squeezed); a front wheel master cylinder 14 generates hydraulic pressure in the same manner as in the first embodiment to apply a braking force to the front wheels 2a, 2b. On the other hand, when the brake pedal 23 is operatively turned downward, a part of the applied manipulating force is transmitted to a force actuator 13c provided on the front brake lever 13 through a length of brake cable 24. The force actuator 13c of the front wheel brake lever 13 is rotated, the front wheel master cylinder 14 generates hydraulic pressure, and the hydraulic pressure brakes the front wheels 2a, 2b in the same manner as in the case where the front wheel brake lever 13 is operated directly.

Further, the remainder of the manipulating force on the brake pedal 23 causes the rear wheel master cylinder 28 to generate hydraulic pressure, and the hydraulic pressure brakes the rear wheels 6a, 6b.

In this manner, with the second embodiment, a braking force is applied to only the front wheels 2a, 2b in the case where the front brake lever 13 is manipulated. Also, a braking force is applied to both the front wheels 2a, 2b and the rear wheels 6a, 6b in the case where only the brake pedal 23 is manipulated. Accordingly, for example, when a rider steps on the brake pedal 23 in a state of riding on a small-sized vehicle, on which the brake system according to the second embodiment is mounted, the front and rear wheels are braked at the same time. As a result, hands are made free so that a rider can perform another work using hands while simultaneously stopping the vehicle. Also, in the case where a braking force is applied to the front and rear wheels at the same time, a large braking force is generated as compared with braking of only the front wheels or the rear wheels, so that it is possible to stop the vehicle more quickly.

In both the first and second embodiments, since a manipulating force is transmitted from the hand-operated lever to the brake members through a hydraulic system, an improved feeling of responsiveness is obtained. Additionally, since a manipulating force is transmitted to the master cylinder, freedom in layout of the force actuator is increased.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For example, although in the first and second embodiments, the brake pedal 23 extends rearward from the pivot shaft 23a, the brake pedal 23 may extend forward and a tread part 23b may be formed at a front end thereof. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A brake system for a vehicle including at least front and rear wheels, the brake system comprising:
   a braking force generating mechanism that applies a braking force to at least one of a front wheel and a rear wheel of the vehicle, the braking force generating mechanism comprising a master cylinder disposed on a handlebar of the vehicle and a piston reciprocally movable along an axis within the master cylinder;
   a brake lever assembly rotationally supported on the handlebar of the vehicle, wherein the master cylinder is disposed adjacent the brake lever assembly, and including a hand-operated lever and a force actuator, the force actuator moving between at least first and second positions so as to selectively actuate the braking force generating mechanism to produce a braking force, the force actuator interacting with the hand-operated lever such that movement of the hand-operated lever moves the force actuator from the first position to at least the second position;
   a foot-operated brake pedal coupled to the force actuator of the brake lever assembly by a cable, in which a first end of the cable is connected to the foot-operated brake pedal and a second end of the cable is connected to the force actuator through an engagement member, wherein the engagement member is coupled for movement with the second end of the cable, the engagement member defines a slot that is parallel to the axis of the piston, and wherein the force actuator includes pedal input portion that is in sliding engagement with the slot such that movement of the brake pedal moves the cable, which causes a portion of the engagement member defining an end of the slot to contact the pedal input portion and move the force actuator from the first position to the second position, and wherein the pedal input portion slides within the slot when the force actuator is moved by the hand-operated lever such that the cable and the foot-operated pedal are not moved as a result of movement of the force actuator by the hand-operated lever.

2. The brake system of claim 1, wherein the hand-operated lever of the brake lever assembly and the brake pedal each interact with the force actuator independently of each other.

3. The brake system of claim 2, wherein the lever includes a drive surface and the force actuator includes an abutment surface against which the drive surface pushes as the lever moves the force actuator from the first position to the second position.

4. The brake system of claim 1, wherein the lever and the force actuator rotate about the same axis.

5. The brake system of claim 1, wherein the cable and the force actuator are coupled by a lost motion connection such that movement of force actuator by the lever does not move the brake pedal.

6. The brake system of claim 1, wherein the lever and the force actuator are coupled by a lost motion connection such that movement of the force actuator by the brake pedal does not move the lever.

7. The brake system of claim 1, wherein the braking force generating mechanism comprises the master cylinder, at least one hydraulic hose and at least one braking member that applies a braking force to the front wheel or the rear wheel.

8. The brake system of claim 1, wherein the brake lever assembly further comprises a support shaft that rotationally supports the force actuator of the brake lever, and wherein pedal input portion comprises an engagement pin that is pulled by the cable to permit a manipulating force to be transmitted thereto from the brake pedal.

9. The brake system of claim 8, wherein the pedal input portion of the force actuator is positioned outwardly in a radial direction relative to the support shaft.

10. The brake system of claim 1 additionally comprising a second braking force generating mechanism that applies a braking force to the other of the at least front wheel and rear wheel of the vehicle.

11. The brake system of claim 10, wherein the second braking force generating mechanism comprises a master cylinder actuated by the brake pedal.

12. A brake system for a vehicle including at least front and rear wheels, the brake system comprising:
   a brake lever mounted to a handlebar of the vehicle;
   a brake mechanism that applies a braking force to at least a front wheel or a rear wheel of the vehicle, the brake mechanism comprising a master cylinder disposed adjacent to the brake lever on the handlebar and a piston that is reciprocally movable along an axis within the master cylinder;
   a brake pedal; and
   a force actuator arranged to selectively operate the brake mechanism to produce a braking force, the force actuator interacting with the brake lever such that movement of the brake lever moves the force actuator to move the piston and operate the brake mechanism;
   a cable that couples the force actuator to the brake pedal, in which a first end of the cable is connected to the brake pedal and a second end of the cable is connected to the force actuator through an engagement member, wherein the engagement member is coupled for movement with the second end of the cable, the engagement member defines a slot that is parallel to the axis of the piston, and wherein the force actuator includes an engagement pin that is in sliding engagement with the slot such that movement of the brake pedal moves the cable, which causes a portion of the engagement member defining an end of the slot to contact the engagement pin and move the force actuator from the first position to the second position, and wherein the engagement pin slides within the slot when the force actuator is moved by the brake lever such that the cable and the brake pedal are not moved as a result of movement of the force actuator by the brake lever.

13. The brake system of claim 12, wherein the force actuator is movable independent of the brake lever such that movement of the force actuator by the brake pedal does not move the brake lever.

* * * * *